United States Patent
Yang et al.

(10) Patent No.: US 8,570,332 B2
(45) Date of Patent: Oct. 29, 2013

(54) GRAPHICS PROCESSING SYSTEM WITH POWER-GATING CONTROL FUNCTION, POWER-GATING CONTROL METHOD, AND COMPUTER PROGRAM PRODUCTS THEREOF

(75) Inventors: Chia-Lin Yang, Taipei (TW); Po-Han Wang, Taipei (TW); Yu-Jung Cheng, Yuanshan Township, Yilan County (TW)

(73) Assignee: Institute for Information Industry, Taipei (TW)

( * ) Notice: Subject to any disclaimer, the term of this patent is extended or adjusted under 35 U.S.C. 154(b) by 913 days.

(21) Appl. No.: 12/569,701

(22) Filed: Sep. 29, 2009

(65) Prior Publication Data
US 2010/0295852 A1    Nov. 25, 2010

(30) Foreign Application Priority Data
May 25, 2009 (TW) .............................. 98117266 A

(51) Int. Cl.
*G06F 15/16* (2006.01)
*G09G 5/397* (2006.01)

(52) U.S. Cl.
USPC .......................................... 345/502; 345/546

(58) Field of Classification Search
USPC ....................................................... 345/502
See application file for complete search history.

(56) References Cited

U.S. PATENT DOCUMENTS

| 8,098,256 B2 * | 1/2012 | Zipnick et al. ................. 345/581 |
| 2006/0227144 A1 * | 10/2006 | Bleiweiss ...................... 345/502 |
| 2007/0071343 A1 | 3/2007 | Zipnick et al. |
| 2008/0266300 A1 | 10/2008 | Deering et al. |
| 2011/0221742 A1 * | 9/2011 | Deering et al. ............... 345/419 |

FOREIGN PATENT DOCUMENTS

| TW | 200609842 | 3/2006 |
| TW | I297468 B | 6/2008 |

* cited by examiner

*Primary Examiner* — Kee M Tung
*Assistant Examiner* — Leon T Cain, II
(74) *Attorney, Agent, or Firm* — Birch, Stewart, Kolasch & Birch, LLP

(57) ABSTRACT

The invention relates to a power-gating control method for a graphics processing unit having a unified shader unit, which includes a plurality of shaders. The method includes the steps of: rendering a plurality of previous frames; calculating a first number of active shaders for rendering each previous frame, and a corresponding frame rate of each previous frame; determining a second number of active shaders for rendering a next frame immediately following the previous frame according to the first number of active shaders and the corresponding frame rate of each previous frame; and activating corresponding shaders through one or more power-gating control elements according to the second number of active shaders.

21 Claims, 6 Drawing Sheets

GRAPHICS PROCESSING SYSTEM WITH POWER-GATING CONTROL FUNCTION, POWER-GATING CONTROL METHOD, AND COMPUTER PROGRAM PRODUCTS THEREOF

CROSS REFERENCE TO RELATED APPLICATIONS

This application claims priority of Taiwan Patent Application No. 098117266, filed on May 25, 2009, the entire contents of which are incorporated by reference herein.

BACKGROUND

1. Field

The disclosed embodiments relates to the graphics processing, and more particularly to a graphics processing system with power-gating control function and a power-gating control method thereof, for dynamically predicting the required number of active shaders according to frame rate variations.

2. Description of the Related Art

Generally, graphics application programs involve complex and highly detailed graphics renderings, such as three-dimensional (3D) graphics. To meet current graphic program demands, graphics processing units (GPUs) have become an integral component of personal computers or portable devices to handle substantial amounts of computations for displaying various objects, thereby resulting in high power consumption or dissipation. Further, because power consumption is a major concern for battery-powered portable devices, such as mobile phones, it is necessary to reduce total power consumption induced by graphics processing units of mobile phones.

Power dissipation of electronic components typically comprises: dynamic power dissipation induced by voltage sources and operating frequencies; and static power dissipation caused by current leakage. Given the current state of semiconductor processing technologies, power dissipation from current leakage is a problem. For example, current leakage has exceeded 40% or more of the total power dissipation for semiconductor products fabricated using 65 nm process technologies.

Typically, clock-gating control techniques or dynamic voltage and frequency (DVFS) techniques are used to save power. Both are effective in decreasing dynamic power dissipation, but leakage power dissipation still remains, or may only be partially reduced. According to other conventional methods, such as power-gating control techniques, power-gating control elements are arranged over an entire graphics processing unit and the power supplied to the entire graphics processing unit is correspondingly controlled via the power-gating control elements. However, such a method lacks design flexibility. Additionally, power-gating control elements may be arranged inside of each component. When one component is idle, the power supplied thereto is turned off via a corresponding power-gating control element, so as to simultaneously reduce dynamic and static power loss. However, such a power-gating control mechanism requires an extra control circuit for turning on/off the power supplied to each component, which must consume power. In addition, the execution of the power-gating control function introduces a significant time overhead for resuming the power supplied to each component, thereby forming the power-gating control mechanism inefficient and time-consuming.

Therefore, it is desired to provide a graphics processing unit with improved power-gating control techniques that facilitates power saving based on the demands for different graphics application programs.

BRIEF SUMMARY

An embodiment of a graphics processing system with power-gating control function is provided. The graphics processing system includes a graphics processing unit and a driver. The graphics processing unit includes a unified shader unit and one or more power-gating control elements. The unified shader unit includes a plurality of shaders. The shaders are used for rendering a plurality of previous frames. The one or more power-gating control elements are coupled to the shaders. The driver is coupled to the graphics processing unit for calculating a first number of active shaders for rendering each previous frame and a corresponding frame rate of each previous frame, and determining a second number of active shaders for rendering a next frame immediately following the previous frames according to the first number of active shaders and the corresponding frame rate of each previous frame. The one or more power-gating control elements activate corresponding shaders according to the second number of active shaders.

In addition, an embodiment of a power-gating control method for a graphics processing unit is provided. The graphics processing unit includes a unified shader unit, which includes a plurality of shaders. The method includes the steps of: rendering a plurality of previous frames; calculating a first number of active shaders for rendering each previous frame, and a corresponding frame rate of each previous frame; determining a second number of active shaders for rendering a next frame immediately following the previous frames according to the first number of active shaders and the corresponding frame rate of each previous frame; and activating corresponding shaders through one or more power-gating control elements according to the second number of active shaders.

The power-gating control method may take the form of a programming code. When the programming code is loaded into and executed by a machine, the machine becomes an apparatus for practicing the disclosed embodiments.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
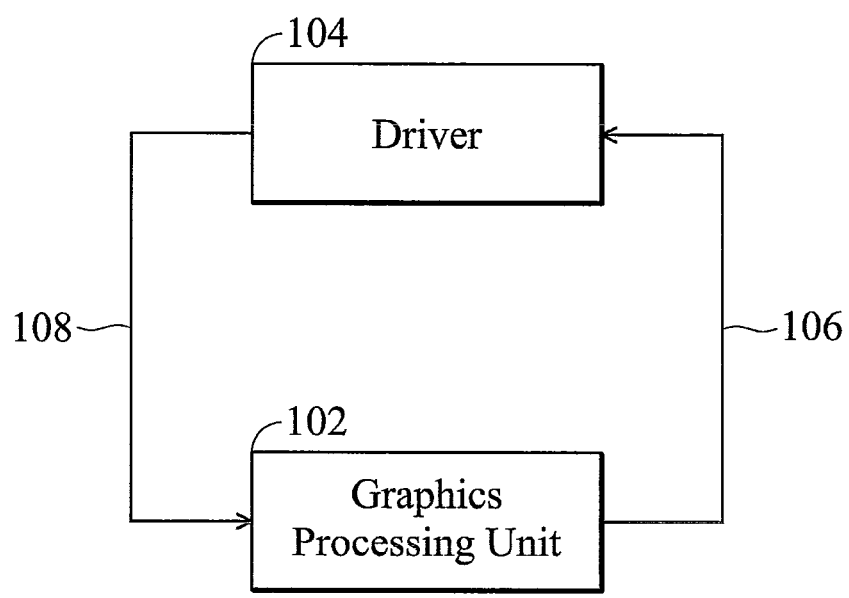
FIG. 1 is a block diagram illustrating an embodiment of a power-gating control method.

FIG. 1 is a block diagram illustrating an embodiment of a power-gating control method for a graphics processing system.

According to the embodiment of FIG. 1, a power-gating control circuit is arranged into a graphics processing unit 102, thereby forming the graphics processing unit 102 with power-gating control function. Further, prior to rendering a frame, the graphics processing unit 102 determines a frame rate (i.e., a frame rate per second, FPS) of the frame through a driver 104, for indicating a loading for rendering the frame. Then, based on the loading for rendering the frame, the drive 104 controls power-on and power-off of the associated function components within the graphics processing unit 102. The entire power consumption of the graphics processing unit 102 is improved without affecting user experience and rendering performance (such as smooth representation of frames).

More specifically, when the graphics processing unit 102 completes the operation for rendering a frame in an embodiment, the drive 104 calculates the corresponding frame rate of the frame for determining a frame rate of a next frame (as indicated by an arrow 106). Next, before the graphics processing unit 102 proceeds the operation for rendering the next frame, the driver 104 controls the graphics processing unit 102 according to the frame rate of the next frame, such as setting the power-on and power-off of the associated function components (as indicated by an arrow 108), In other embodiments, the frame rate of the next frame may be determined on the basis of frame rates corresponding to a plurality of previous frames.

Figure 2:
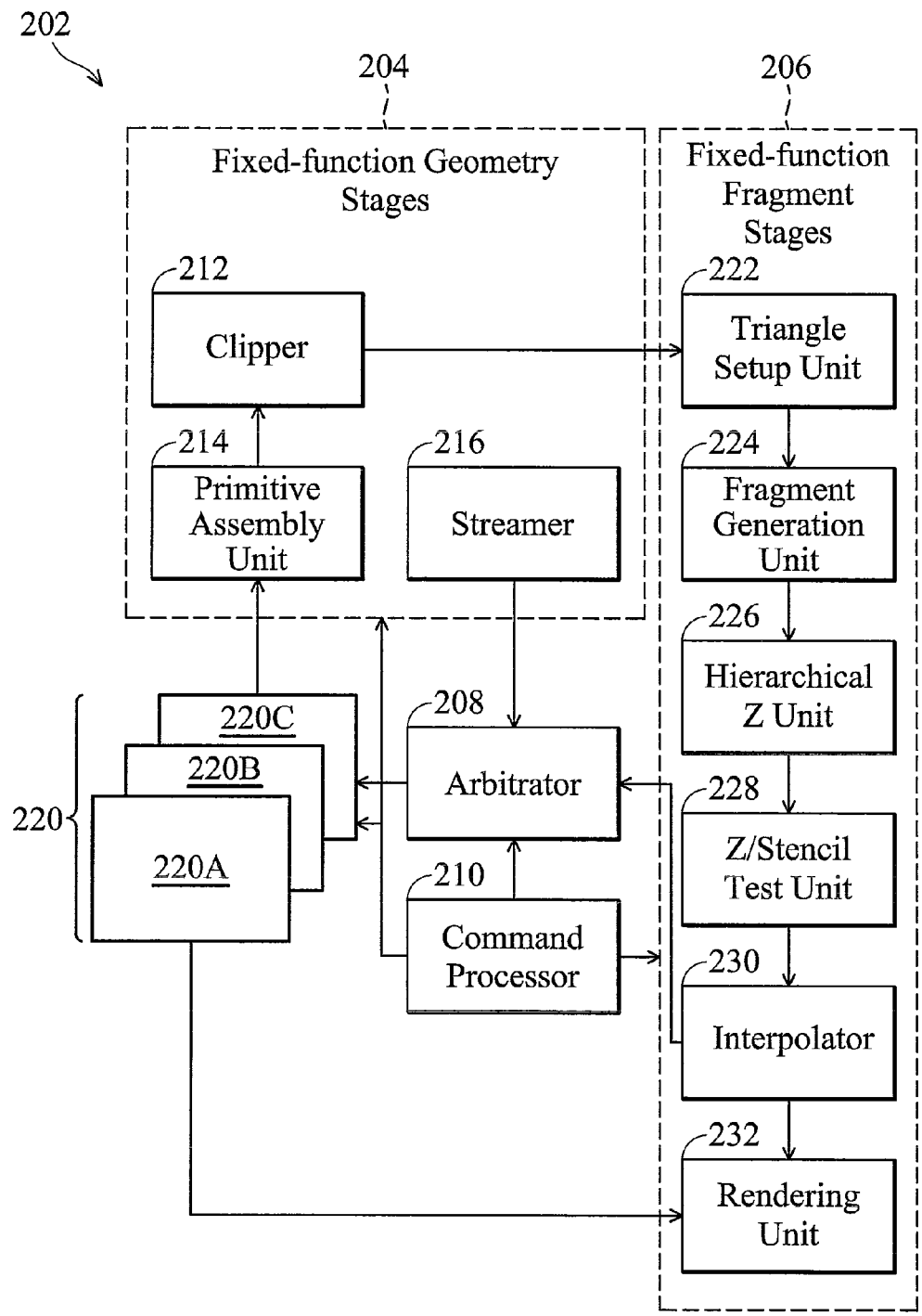
FIG. 2 is a block diagram illustrating an embodiment of a graphics processing unit.

FIG. 2 is a block diagram illustrating an embodiment of a graphics processing unit 202.

Referring to FIG. 2, the graphics processing unit 202 comprises a unified shader unit 220, which is a multi-processor capable of processing several instructions in a single clock. The unified shader unit 220 comprises a plurality of shaders (i.e., shader processors or shader cores), such as 220A, 220B, 220C, and etc. Each shader may be of a vector and scalar structure, or a multiple scalar with very long instruction word (VLIW) structure, as well as corresponding register files and instruction cache memories. Moreover, each shader executes various shader programs, such as the operations of a vertex shader and a pixel shader, so as to render each frame. Additionally, the graphics processing unit 202 further comprises fixed-function geometry stages 204, fixed-function fragment stages 206, an arbitrator 208, and a command processor 210.

Specifically, the fixed-function geometry stages 204 comprise a clipper 212, a primitive assembly unit 214, and a streamer 216. In the pipelined stages 204, the streamer 216 receives vertex information of a 3D object and transmits the information to the shaders. Then, the shaders 220A, 220B, and 220C execute the corresponding shader programs for determining attributes of vertex information of the 3D object, so as to transform the 3D object into a frame displayed on a screen. Following, the primitive assembly unit 214 performs geometry assembly for grouping vertices into polygons, such triangles. The clipper 212 culls triangles outside visible zones.

Further, the fixed-function fragment stages 206 comprise a triangle setup unit 222, a fragment generation unit 224, a hierarchical Z unit 226, a Z/stencil test unit 228, an interpolator 230, and a rendering unit 232. In the pipelined stages 206, the triangle setup unit 222 performs face-culling operations for dropping invisible triangles and calculating edge equations of the triangles. The fragment generation unit 224 provides fragment generation of triangles for calculating pixels for display. The hierarchical Z unit 226 is alternatively arranged into the fixed-function fragment stages 206 for removing fragments outside the triangles or visible zones, as well as allowing a block removal of fragments. The Z/stencil test unit 228 determines and removes invisible fragments by use of Z buffers and stencil buffers. The interpolator 230 generates fragment attributes by interpolating triangle attributes with a perspective correction. Afterward, the rendering unit 232 performs pixel rendering. In an embodiment, the Z/stencil test unit 228 may also be arranged after the rendering unit 232.

In operation, the command processor 210 is used for receiving various rendering commands, thereby monitoring and configuring power states of the shaders. The arbitrator 208 performs thread scheduling according to the various rendering commands, as well as distributes the rendering commands to each shader to process 3D rendering calculations. As the unified shader unit 220 requires a great number of rendering calculations, thus making it become the power consumption bottleneck of the graphics processing unit 202. In addition, since different loadings may be conducted for rendering of each frame, power-gating control may be performed on each shader to control the power supplied thereto. For example, each power-gating control element for each shader 220A, 220B, and 220C may be respectively turned on or turned off. As such, dynamic power dissipation or leakage power loss of the graphics processing unit 202 are reduced, so as to decrease the power consumption of the graphics processing unit 202 without affecting operation performance of application programs.

Figure 3:
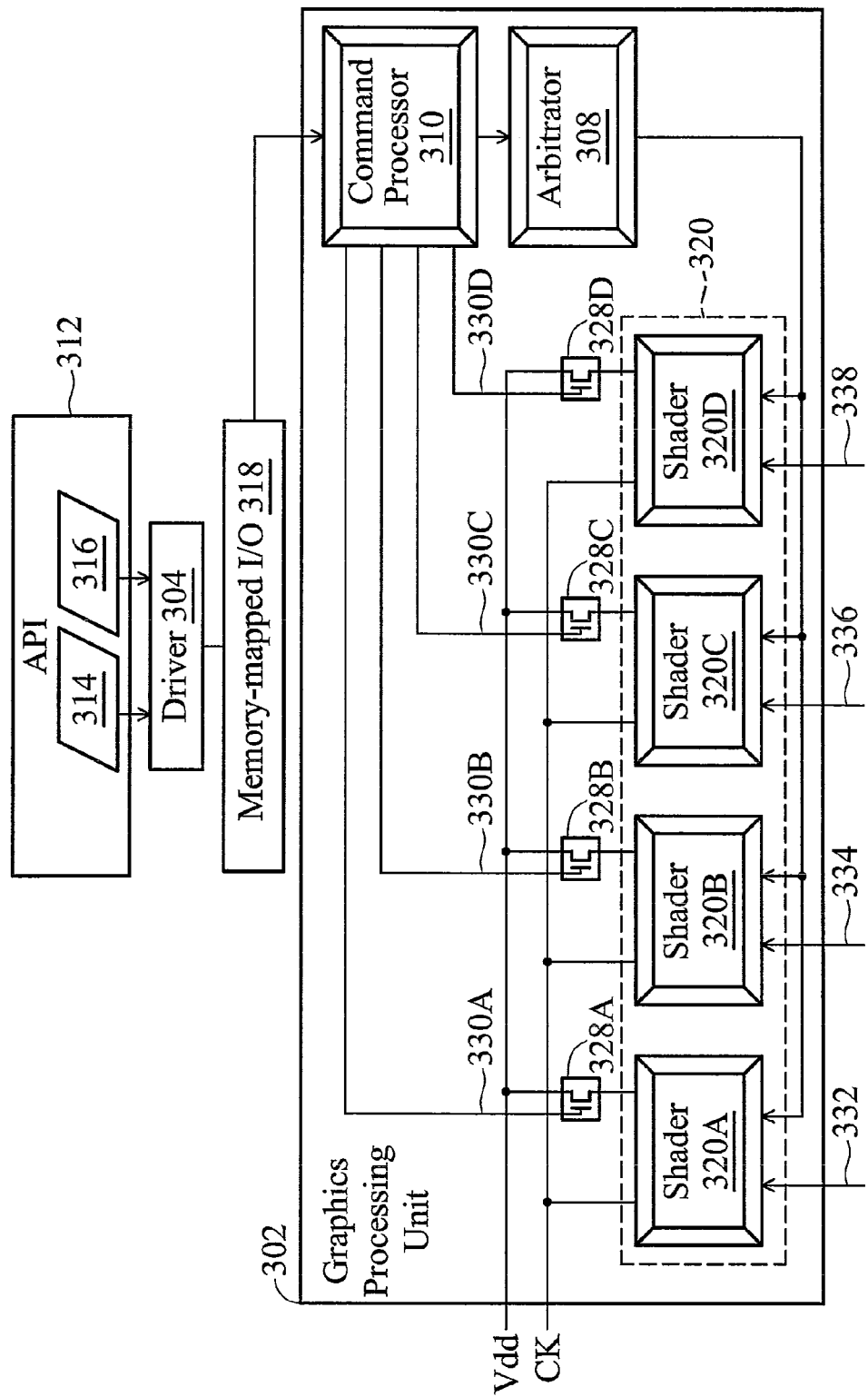
FIG. 3 is a block diagram illustrating an embodiment of a graphics processing system with power-gating control function.

FIG. 3 is a block diagram illustrating an embodiment of a graphics processing system with power-gating control function.

Referring to FIG. 3, the graphics processing system comprises a graphics processing unit 302 and a driver 304. According to the embodiment of FIG. 3, the graphics processing unit 302 comprises a unified shader unit 320 having 4 shaders 320A, 320B, 320C, and 320D for rendering a plurality of frames. The unified shader unit 320, which is similar to the unified shader unit as shown in FIG. 2, is a multiple processor capable of processing multiple commands in a single clock. Further, the graphics processing unit 302 comprises 4 power-gating control elements 328A, 328B, 328C, and 328D, respectively coupled to each shader. The power-gating control elements is used for activating or deactivating corresponding shaders according to corresponding control signals 330A, 330B, 330C, and 330D. The driver 304 is coupled to the graphics processing unit 302 for receiving and executing various application programs, e.g. a first application program 314 and a second application program 316, via an application programming interface (API) 312, so as to correspondingly drive the graphics processing unit 302 to perform rendering. The power-gating control method of the graphics processing system will be described below in more detail with reference to FIGS. 3 and 4.

Figure 4:
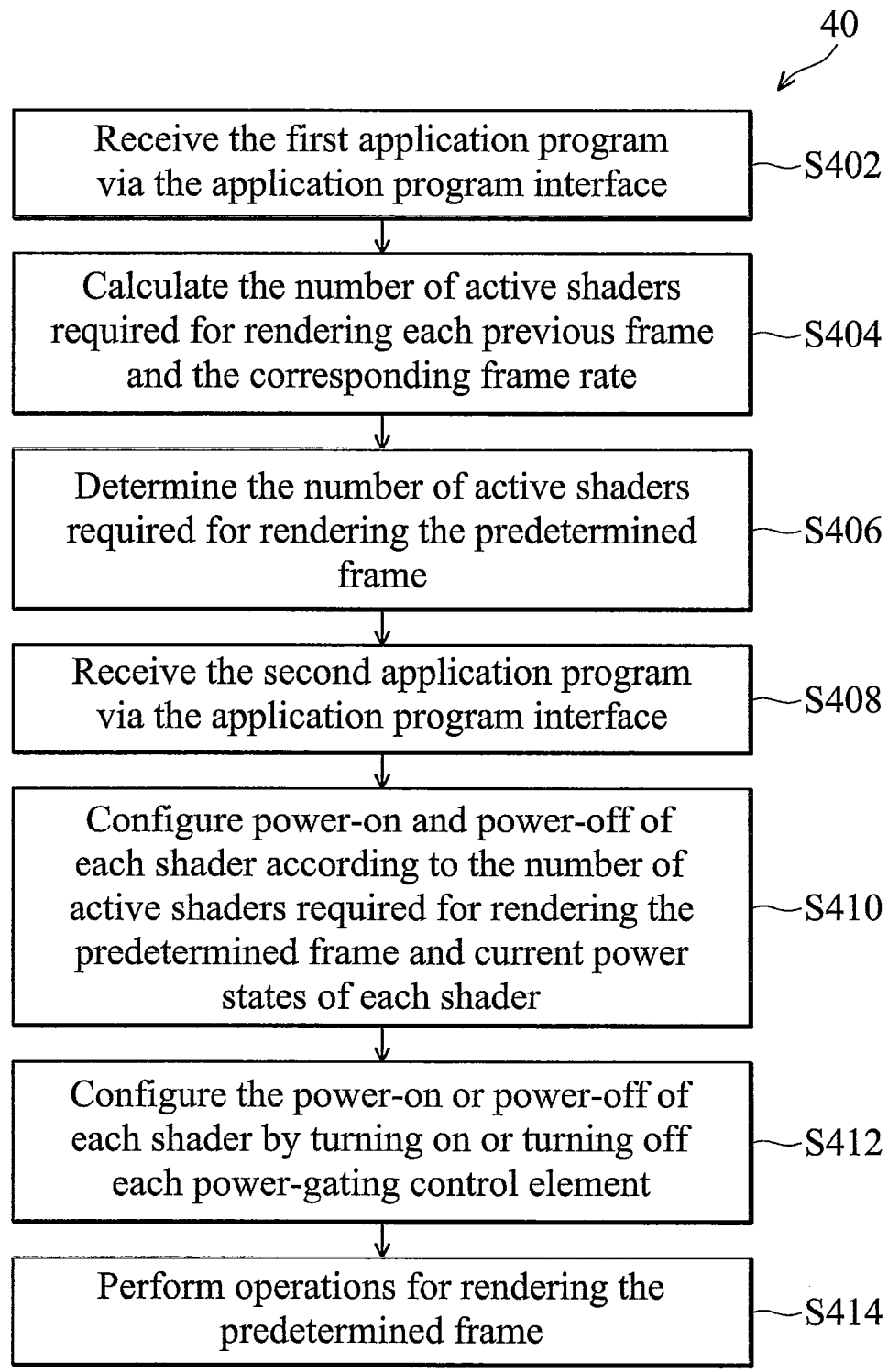
FIG. 4 is a flowchart illustrating an embodiment of a power-gating control method.

FIG. 4 is a flow diagram illustrating an embodiment of a power-gating control method 40.

From the aforementioned description, before the graphics processing unit 302 renders a predetermined frame $Frame_{n+1}$, the driver 304 may utilize a history-based calculation algorithm to predict the number of active shaders $S_{n+1}$ required for the graphics processing unit 302 to render the predetermined frame $Frame_{n+1}$ based on the frame rates $FPS_n$, $FPS_{n-1}$, $\Lambda$, $FPS_{n-m+1}$ and the number of active shaders $S_n$, $S_{n-1}$, $\Lambda$, $S_{n-m+1}$ corresponding to each previous rendered frames $Frame_n$, $Frame_{n-1}$, $\Lambda$, $Frame_{n-m+1}$. Note that m represents the number of the previous frames used for predication. Subsequently, the power-gating control elements activates or deactivates the corresponding shaders by controlling the power supplied thereto. Accordingly, the graphics processing unit 302 may operate more efficiently and total power consumption of the graphics processing unit is significantly reduced.

Further, the driver 304 drives the graphics processing unit 302 to perform various rendering operations according to requests from each application program. Thus, the driver 304 may also determine the start and end of frame rendering according to the requests from each application program. For example, the first application program 314 may comprise a command SwapBuffer for indicating the end of frame rendering. Also, the second application program 316 may comprise a command ClearBuffer for indicating the end of frame rendering. Thus, the power-gating control may be performed during the execution of the above-mentioned commands, without deteriorating the rendering performance.

As shown in FIGS. 3 and 4, when the driver 304 receives the first application program 314 via the application program interface 312, the driver 304 then generates corresponding command packets and transmits the corresponding command packets to a command processor 310 of the graphics processing unit 302 via a memory-mapped I/O 318 (step S402).

In response to the execution of the command SwapBuffer, i.e., the rendering of a previous frame Frame$_n$ immediately preceding the predetermined frame Frame$_{n+1}$ is finished, the driver 304 then calculates the number of active shaders $S_n$, $S_{n-1}$, $\Lambda$, $S_{n-m+1}$ required for rendering each previous frame Frame$_n$, Frame$_{n-1}$, $\Lambda$, Frame$_{n-m+1}$, and the corresponding frame rate FPS$_n$, FPS$_{n-1}$, $\Lambda$, FPS$_{n-m+1}$ (step S404).

For example, assuming that m=5, the driver 304 calculates the number of active shaders $S_n$, $S_{n-1}$, $\Lambda$, $S_{n-4}$ required for rendering each previous frame Frame$_n$, Frame$_{n-1}$, $\Lambda$, Frame$_{n-4}$ preceding the predetermined frame Frame$_{n+1}$, and the corresponding frame rates FPS$_n$, FPS$_{n-1}$, $\Lambda$, FPS$_{n-4}$.

Moreover, the driver 304 determines the number of active shaders $S_{n+1}$ required for rendering the predetermined frame Frame$_{n+1}$ according to the number of active shaders, $S_n$, $S_{n-1}$, $\Lambda$, $S_{n-m+1}$ required for rendering each previous frame Frame$_n$, Frame$_{n-1}$, $\Lambda$, Frame$_{n-m+1}$, and the corresponding frame rates FPS$_n$, FPS$_{n-1}$, $\Lambda$, FPS$_{n-m+1}$ (step S406).

More specifically, the driver 304 may determine the number of active shaders $S_{n+1}$ required for rendering the predetermined frame Frame$_{n+1}$ according to the following formula:

$$S_{n+1} = \left\lceil \frac{\text{Target\_FPS} + \alpha}{\min\left\{\frac{FPS_n}{S_n}, \frac{FPS_{n-1}}{S_{n-1}}, \Lambda, \frac{FPS_{n-m+1}}{S_{n-m+1}}\right\}} \right\rceil \quad (1)$$

wherein m represents the number of the previous frames, $S_n$, $S_{n-1}$, $\Lambda$, $S_{n-m+1}$ represents the number of active shaders for rendering each previous frames Frame$_n$, Frame$_n$, $\Lambda$, Frame$_{n-m+1}$, FPS$_n$, FPS$_{n-1}$, $\Lambda$, FPS$_{n-m+1}$ represents the frame rates corresponding to each previous frame Frame$_n$, Frame$_n$, Frame$_{n-m+1}$, Target_FPS represents a target frame rate adjusted according to the display requirement, α represents a control variable, and n≥m.

Then, when the driver 304 receives the second application program 316 via the application program interface 312 (step S408), in response to the execution of the command ClearBuffer, i.e., start to render the predetermined frame Frame$_{n+1}$, the driver 304 generates a corresponding command packet according to the number of active shaders $S_{n+1}$ required for rendering the predetermined frame Frame$_{n+1}$ and current power states of each shader 320A, 320B, 320C, and 320D. As such, power-on and power-off of each shader 320A, 320B, 320C, and 320D are accordingly configured. And, the corresponding command packet is transmitted to the command processor 310 (step S410). In an embodiment, it is assumed that the number of active shaders $S_n$ used for the previous frame Frame$_n$ preceding the predetermined frame Frame$_{n+1}$ is greater than the number of active shaders $S_{n+1}$ required for rendering the predetermined frame Frame$_{n+1}$. Thus, the corresponding inactive shaders are powered off and deactivated. Otherwise, the corresponding active shaders are powered on and activated.

Following, in response to the command packet, the command processor 310 generates control signals 330A, 330B, 330C, and 330D respectively for turning on or turning off each power-gating control element 328A, 328B, 328C, and 328D, so as to configure the power-on or power-off of each shader 320A, 320B, 320C, and 320D and then inform the arbitrator 308 (step S412).

Afterward, the arbitrator 308 distributes the rendering commands according to the activated shaders. Operations for rendering the predetermined frame Frame$_{n+1}$ is then performed (step S414). For example, the predetermined frame Frame$_{n+1}$ may be rendered by use of tile-based rendering.

According to an embodiment, each power-gating control element comprises a transistor. As shown in FIG. 3, each power-gating control element comprises an NMOS transistor coupled between a voltage source Vdd and a corresponding shader and has a gate for receiving a corresponding control signal from the command processor 310. Therefore, each transistor is turned on or off by the corresponding control signal, so as to determine whether the voltage source Vdd is supplied to each shader.

Furthermore, in operation, each shader 320A, 320B, 320C, and 320D may have a respective texture unit, or share one or more texture units. Thus, each shader 320A, 320B, 320C, and 320D receives texture information from the texture units through a respective texture accessing route 332, 334, 336, and 338. In this case, the power-gating control elements may be flexibly arranged according to the arrangement of the texture units. As such, power management efficiency is significantly improved. The aforementioned power-gating control mechanism will be described below in more detail with reference to FIGS. 5 and 6.

Figure 5:
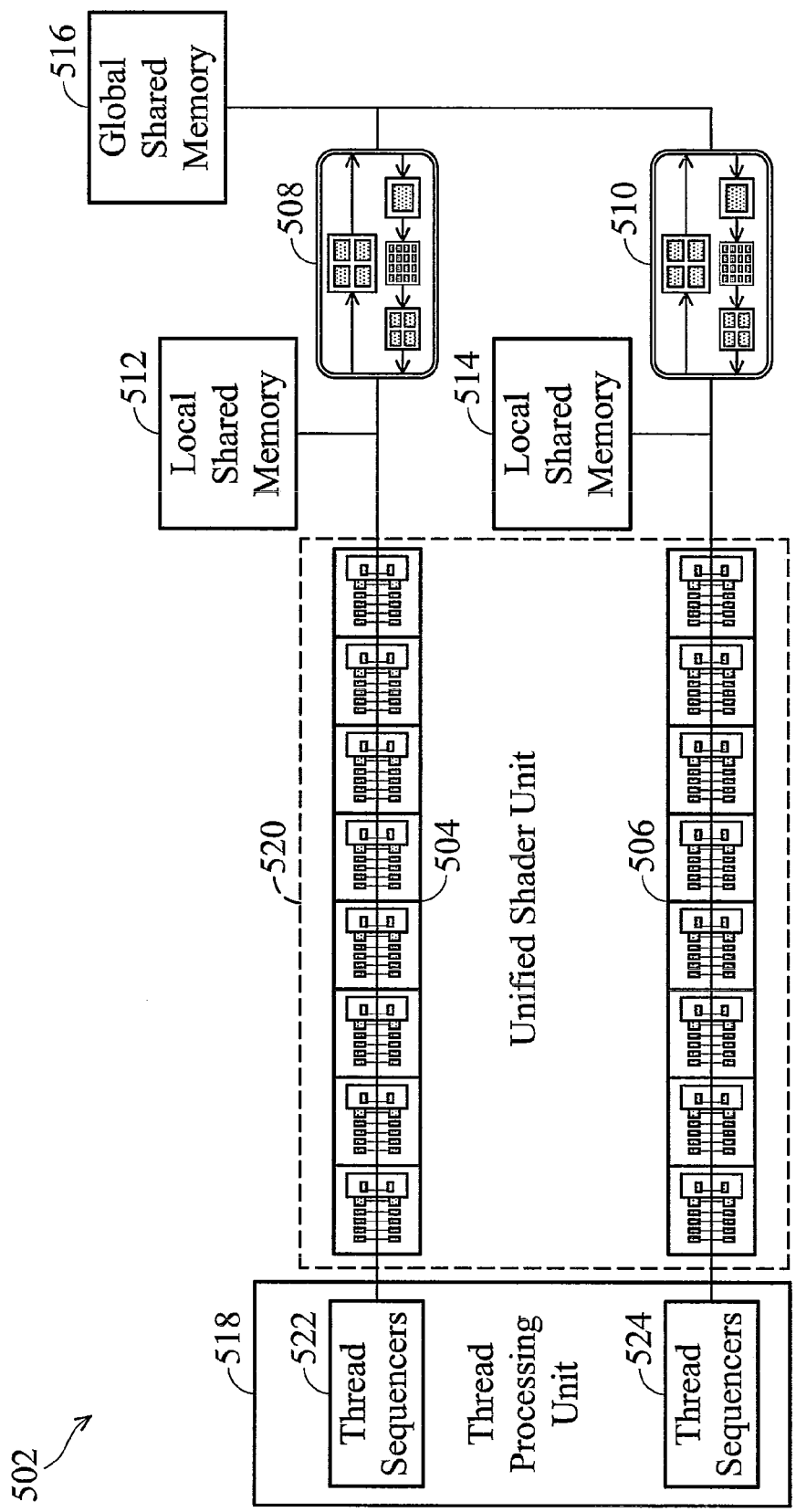
FIG. 5 is a block diagram illustrating another embodiment of a graphics processing unit.

FIG. 5 is a block diagram illustrating another embodiment of a graphics processing unit 502.

Referring to FIG. 5, the graphics processing unit 502 comprises a unified shader unit 520, local shared memories 512 and 514, texture units 508 and 510, a global shared memory 516 and a thread processing unit 518.

According to this embodiment, the unified shader unit 520 comprises a plurality of shaders. The shaders comprise two shader clusters 504 and 506, which utilize their respective local shared memories 512 and 514 to perform rendering. In addition, the shader clusters 504 and 506 are respectively coupled to the two texture units 508 and 510. And, the global shared memory 516 is shared by the texture units 508 and 510. Specifically, each shader cluster comprises 8 shaders. The thread processing unit 518 comprises two thread sequencers 522 and 524 for distributing threads.

In this case, each shader cluster 504 and 506 is arranged with a power-gating control element. As such, the turning-on or turning-off of each power-gating control element is used to activate or deactivate the corresponding shader cluster. Additionally, the power supplied to the local shared memory and texture units associated with each shader cluster may be also controlled. The cost for power-gating control circuitry is reduced and the power consumption from the peripheral elements of the shaders is decreased.

Figure 6:
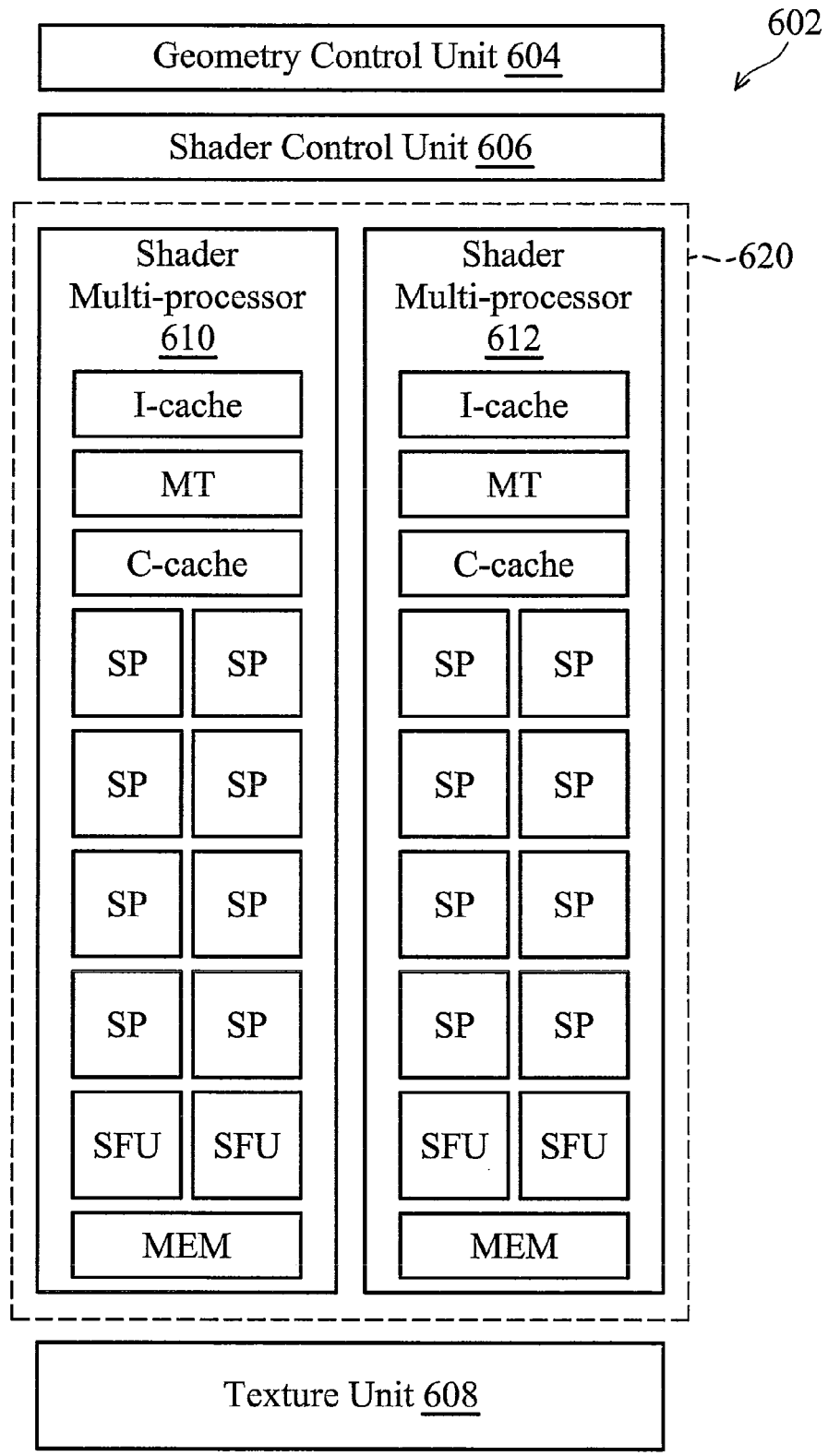
FIG. 6 is a block diagram illustrating another embodiment of a graphics processing unit.

FIG. 6 is a block diagram illustrating another embodiment of a graphics processing unit 602.

Referring to FIG. 6, the graphics processing unit 602 comprises a unified shader unit 620, a geometry control unit 604, a shader control unit 606 and a texture unit 608.

According to this embodiment, the unified shader unit 620 has a plurality of shaders. The shaders comprise two shader multi-processors 610 and 612. The two shader multi-processors 610 and 612 form a shader cluster and share the texture unit 608 to perform rendering. The geometry control unit 604 and the shader control unit 606 are used for receiving data and distributing rendering operations. In FIG. 6, each shader multi-processor comprises 8 shaders SPs, I-cache, C-cache, multi-thread issue unit MT, two special function units SFUs and a shared memory MEM for performing rendering calculation. According to this structure, the shader multi-processor units 610 and 612 share the texture unit 608. As a result, the two shader multi-processor units 610 and 612 may be regarded as a power management unit, and the power supply thereof is controlled by a power-gating control element. When the power-gating control element is turned-off, the entire shader cluster, i.e., the shader multi-processor units 612 and 612, and the texture unit 608 are accordingly deactivated. Further, power-gating control elements and power consumption are decreased.

As a result, the graphics processing system and the power-gating control method according to the aforementioned embodiments are capable of dynamically controlling the number of active shaders during frame rendering according to frame rate variations for each frame, thereby decreasing unnecessary power consumption.

The graphics processing systems and the power-gating control methods, or certain aspects or portions thereof, may take the form of program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A power-gating control method for a graphics processing unit having a unified shader unit, which comprises a plurality of shaders, comprising:
rendering a plurality of previous frames via first active shaders of the plurality of shaders;
calculating a number of the first active shaders required for rendering each of the plurality of previous frames, and respective frame rate of each of the plurality of previous frames;
determining a number of second active shaders of the plurality of shaders used for rendering a next frame immediately following the previous frames based on the calculated number of the first active shaders required for rendering each of the plurality of previous frame and the calculated frame rate of each previous frame; and
activating corresponding shaders of the plurality of shaders through one or more power-gating control elements according to the determined number of the second active shaders used for rendering the next frame immediately following the previous frames.

2. The power-gating control method as claimed in claim 1, further comprising:
rendering the next frame by use of the activated shaders.

3. The power-gating control method as claimed in claim 1, further comprising:
executing a first application program; and
calculating the first number of active shaders and the corresponding frame rate of each previous frame in response to the execution of the first application program, wherein the first application program corresponds to the end of each previous frame.

4. The power-gating control method as claimed in claim 1, wherein determining the second number of active shaders comprises:
obtaining a power state of each shader prior to determining the second number of active shaders.

5. The power-gating control method as claimed in claim 4, wherein activating the corresponding shaders comprises:
executing a second application program; and
generating a command packet in response to the execution of the second application program according to the second number of active shaders and the power state of each shader, for controlling the one or more power-gating control elements,
wherein the second application program corresponds to the start of the next frame.

6. The power-gating control method as claimed in claim 5, further comprising:
generating one or more control signals in response to the command packet,
wherein each power-gating control element is turned on or turned off by a corresponding control signal.

7. The power-gating control method as claimed in claim 6, wherein each power-gating control element comprises a transistor coupled between a voltage source and at least one shader, and the transistor determines whether the at least one shader is supplied by the voltage source according to the corresponding control signal.

8. The power-gating control method as claimed in claim 1, wherein the shaders comprise a plurality of shader clusters coupled to a plurality of texture units, each texture unit is coupled to at least one shader cluster, and each power-gating control element activates a texture unit and the at least one shader cluster coupled thereto.

9. The power-gating control method as claimed in claim 1, wherein the second number of active shaders is generated by the following formula:

$$S_{n+1} = \left\lceil \frac{\text{Target\_FPS} + \alpha}{\min\left\{ \frac{FPS_n}{S_n}, \frac{FPS_{n-1}}{S_{n-1}}, \Lambda, \frac{FPS_{n-m+1}}{S_{n-m+1}} \right\}} \right\rceil,$$

wherein $S_{n+1}$ represents the second number of active shaders for rendering the next frame, M represents the number of the previous frames, $S_n, S_{n-1}, \ldots, S_{n-m+1}$ represents the first number of active shaders for rendering each previous frame, $FPS_n, FPS_{n-1}, \ldots, FPS_{n-m+1}$ represents the frame rate corresponding to each previous frame, Target _FPS represents a target frame rate, α represents a control variable, and n≥m.

10. A graphics processing system with power-gating control function comprising:

a graphics processing unit, comprising a unified shader unit and one or more power-gating control elements, the unified shade comprising a plurality of shaders, wherein the plurality of shaders comprises first active shaders for rendering a plurality of previous frames and the one or more power-gating control elements are coupled to the shaders; and a driver coupled to the graphics processing unit for calculating a number of the first active shaders required for rendering each of the plurality of previous frames and respective frame rate of each of the plurality of previous frames, and determining a number of second active shaders of the plurality of shaders used for rendering a next frame immediately following the previous frames based on the calculated number of the first active shaders required for rendering each of the plurality of previous frame and the calculated frame rate of each previous frame, wherein the one or more power-gating control elements are configured to activate corresponding shaders of the plurality of shaders according to the determined number of the second active shaders used for rendering the next frame immediately following the previous frames.

11. The graphics processing system as claimed in claim 10, wherein the graphics processing system renders the next frame by use of the activated shaders.

12. The graphics processing system as claimed in claim 10, wherein when a first application program is executed, in response to the execution of the first application program, the driver calculates the first number of active shaders and the corresponding frame rate of each previous frame, and the first application program corresponds to the end of each previous frame.

13. The graphics processing system as claimed in claim 10, wherein the driver obtains a power state of each shader prior to determining the second number of active shaders.

14. The graphics processing system as claimed in claim 13, wherein when a second application program is executed, in response to the execution of the second application program, the driver generates a command packet according the second number of active shaders and the power state of each shader, for controlling the one or more power-gating control elements, and the second application program corresponds to the start of the next frame.

15. The graphics processing system as claimed in claim 14, wherein the graphics processing unit comprises:

a command processor coupled to the driver for generating one or more control signals in response to the command packet, wherein each power-gating control element is turned on or turned off by a corresponding control signal.

16. The graphics processing system as claimed in claim 15, wherein each power-gating control element comprises a transistor coupled between a voltage source and at least one shader the transistor determines whether the at least one shader is supplied by the voltage source according to the corresponding control signal.

17. The graphics processing system as claimed in claim 10, wherein the shaders comprises a plurality of shader clusters coupled to a plurality of texture units, each texture unit is coupled to at least one shader cluster, and each power-gating control element activates a texture unit and the at least one shader cluster coupled thereto.

18. The graphics processing system as claimed in claim 10, wherein the second number of active shaders is generated by the following formula:

$$S_{n+1} = \left\lceil \frac{\text{Target\_FPS} + \alpha}{\min\left\{\frac{FPS_n}{S_n}, \frac{FPS_{n-1}}{S_{n-1}}, \Lambda, \frac{FPS_{n-m+1}}{S_{n-m+1}}\right\}} \right\rceil,$$

wherein $S_{n+1}$ represents the second number of active shaders for rendering the next frame, M represents the number of the previous frames, $S_n, S_{n-1}, \ldots, S_{n-m+1}$ represents the first number of active shaders for rendering each previous frame, $FPS_n, FPS_{n-1}, \ldots, FPS_{n-m+1}$ represents the frame rate corresponding to each previous frame, Target _FPS represents a target frame rate, α represents a control variable, and n ≥m.

19. A computer program product comprising a non-transitory computer-readable storage medium having computer-executable program code instructions stored therein, the computer program product being loaded into and executed by a machine to perfoun a power-gating control method for a graphics processing unit having a unified shader unit, which comprises a plurality of shaders, the computer-executable program code instructions comprising:

a first program code for rendering a plurality of previous frames via first active shaders of the plurality of shaders;

a second program code for calculating a number of the first active shaders required for rendering each of the plurality of previous frames, and respective frame rate of each of the plurality of previous frames;

a third program code for determining a number of second active shaders of the plurality of shaders used for rendering a next frame immediately following the previous frames based on the calculated number of the first active shaders required for rendering each of the plurality of previous frame and the calculated frame rate of each previous frame; and a fourth program code for activating corresponding shaders of the plurality of shaders through one or more power-gating control elements according to the determined number of the second active shaders used for rendering the next frame immediately following the previous frames.

20. The computer program product as claimed in claim 19, wherein the shaders comprise a plurality of shader clusters coupled to a plurality of texture units, each texture unit is coupled to at least one shader cluster, and each power-gating control element activates a texture unit and the at least one shader cluster coupled thereto.

21. The computer program product as claimed in claim 19, wherein the second number of active shaders is generated by the following formula:

$$S_{n+1} = \left\lceil \frac{\text{Target\_FPS} + \alpha}{\min\left\{\frac{FPS_n}{S_n}, \frac{FPS_{n-1}}{S_{n-1}}, \Lambda, \frac{FPS_{n-m+1}}{S_{n-m+1}}\right\}} \right\rceil,$$

wherein $S_{n+1}$ represents the second number of active shaders for rendering the next frame, m represents the number of the previous frames, $S_n, S_{n-1}, \ldots, S_{n-m+1}$ represents the first number of active shaders for rendering each previous frame, $FPS_n, FPS_{n-1}, \ldots, FPS_{n-m+1}$ represents the frame rate corresponding to each previous frame, Target_FPS represents a target frame rate, $\alpha$ represents a control variable, and $n \geq m$.

* * * * *